United States Patent Office 3,258,305
Patented June 28, 1966

3,258,305
POLYAMIDES CONTAINING TERTIARY AMINO GROUPS AND THEIR USE IN THE TREATMENT OF CELLULOSIC TEXTILES
Bethlehem K. Andrews, Metairie, and John G. Frick, Jr., New Orleans, La., assignors to the United States of America as represented by the Secretary of Agriculture
No Drawing. Filed Dec. 12, 1961, Ser. No. 158,913
1 Claim. (Cl. 8—116.3)

A non-exclusive, irrevocable, royalty-free license in the invention herein described, throughout the world for all purposes of the United States Government, with the power to grant sublicenses for such purposes, is hereby granted to the Government of the United States of America.

This patent application is a continuation-in-part of our co-pending application, Serial #115,269, filed June 6, 1961, now Patent No. 3,167,384.

Cellulosic textiles are known to have an inherently poor ability to recover from undesirable wrinkling and creasing. There is a large demand for a treatment that will impart wrinkle resistance, and yet allow the textile to retain most of its original desirable characteristics.

Some of the existing treatments used are methylol derivatives of organic amides, formed from the reaction of formaldehyde with amides such as urea, melamine, and dicarboxylic acid diamides. After hypochlorite bleaching, however, textiles so treated often are susceptible to severe strength losses or suffer discoloration. To prevent this, treatments have been devised utilizing alkyl substituents on the amido nitrogen of the compound. These substituents replace any amido hydrogens remaining after the reaction with formaldehyde and thereby remove the groups that react with hypochlorites.

All of these suffer some disadvantages. For example, N,N'-dimethyl diamido derivatives of dicarboxylic acids have been used to prepare the dimethylol compounds. These have reduced effectiveness in producing desired wrinkle resistance.

Cyclic substituents such as in ethyleneurea have been used. The methylol derivative of this compound, dimethylol ethyleneurea, is highly effective in producing wrinkle resistance, and is initially resistant to damage from hypochlorite bleach. The finish, however, lacks durability to such acidic conditions as souring which is commonly encountered in many commercial launderies. The immunity to hypochlorite bleaching is also lost on repeated laundering, with or without souring. The dimethylol triazones, another widely known type of agent, contain a tertiary amino group in the cyclic substituent. This tertiary amino group is believed to neutralize the effects of hypochlorite bleaching. These compounds, however, produce a finish that is lacking in durability and is subject to discoloration on overheating, such as may occur in ironing.

It is the purpose of this invention to produce compounds of the organic amide class that can be used to impart durable wrinkle resistance finishes to cellulosic textiles. The finish so produced will give a high degree of wrinkle resistance, withstand hypochlorite bleaching without damage to the treated textile, and be durable to laundering in which acidic or alkaline conditions are encountered.

The wrinkle resistance which is the subject of this invention is produced by the treatment of a cellulosic textile with the polymethylol derivative of a new class of polyamides of polycarboxylic acids which are unsubstituted on the amido nitrogen, and which contain a tertiary amino group in the carboxylic acid moiety. This tertiary amino group may be part of the alkyl chain joining the carboxyl groups or may be attached as a substituent on the chain. Even though these agents contain incompletely substituted amido groups, hypochlorite resistance is obtained in the treated fabric, and the effectiveness of the agent remains high.

Examples of the polyamides of this invention are:

bis(carbamoylethyl)methylamine

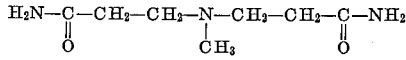

dimethylaminosuccinamide

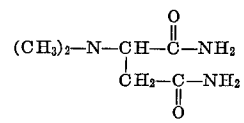

tris(carbamoylethyl)amine

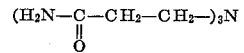

These compounds can be prepared by the reaction of ammonia or the proper amine with the amide of a 1,2-unsaturated carboxylic acid. For example the first of the above-mentioned compounds can be prepared by the reaction of methylamine with acrylamide:

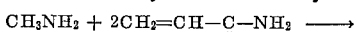

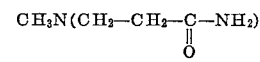

These compounds can be converted to methylol derivatives by the reaction in aqueous solution of one or more moles of formaldehyde, or a substance that liberates formaldehyde, with one mole of the polyamide at pH 9–10. At least one mole formaldehyde is required for each amido group in the polyamide to prepare the fully substituted compound, however, less can be used to prepare a partially methylolated compound. The lower methylol substitution causes reduced effectiveness, but may be desired in some instances where the highest wrinkle resistance is not required. The solution thus prepared is diluted to the padding concentration after standing at least four hours at the specified pH.

In accordance with the invention an aqueous solution is prepared as described above, containing from one to twenty percent of the reaction product containing two or more moles of formaldehyde in combination with one mole of the amide.

About 0.5 percent to 3 percent by weight of a catalyst, based on the total weight of the padding bath, is added to the padding bath to facilitate curing. Catalysts which can be used to promote curing include mineral acids; various salts of strong acids such as ammonium salts; alkanolamine salts; metallic salts of strong acids and weak bases, such as zinc nitrate and magnesium chloride.

The treating solution of the methylol amide and catalyst, prepared as described above, is padded onto the cloth by passing through efficient squeeze rolls to give a wet pickup of sixty to one hundred percent. The curing step, the reaction of the methylol derivative of the polyamide with the textile, is carried out by the usual procedure. The padded textile is dried at an elevated temperature, for example 67–70° C. for seven minutes, then further heated to effect the curing. Improved properties are obtained by curing at 120–160° C. from 0.5 to 10 minutes. The curing step is best followed by an after-wash with a detergent solution to remove any excess unreacted crease resistance agent, and to improve the hand of the textile.

The process and compounds to which this invention relates can be used to treat any hydrophilic fibrous cellulosic textile such as cotton, linen, ramie, jute, regenerated cellulose, and others.

Textiles treated according to the process of this invention are wrinkle resistant, and have in addition wash-andwear properties, that is, textiles so treated require no ironing after washing to maintain a smooth appearance. They can be laundered and bleached in the manner used on untreated textiles without loss of properties or damage to the textile.

The following examples are given as illustrations, and are not by any means intended to limit the scope of this invention. All percentages given in the examples are percentages by weight of the total solution. The fabrics were tested by the following methods: crease recovery angle, Monsanto method, American Society for Testing Materials (ASTM), Standards for Textile Materials D1295–53T; damage caused by retained chlorine (scorch test), American Association of Textile Chemists and Colorists tentative test method 69–1952. The laundering procedure used to test the durability of the finish was the vigorous alkaline wash described in AATCC test method 14–53.

*Example 1*

Preparation of bis(carbamoylethyl)methylamine in methanol:

To 41 g. anhydrous methylamine dissolved in 160 g. methanol was added 199.6 g. acrylamide. The solution was allowed to stand at room temperature for seven days. The crude product, which separated from the solution, melted at 113–120° C. Recrystallization from ethanol yielded 48 g. product melting at 114–116° C.

*Example 2*

Preparation of bis(carbamoylethyl)methylamine in water:

To 38.7 g. 40% aqueous methylamine was added 71.2 .g acrylamide. The solution was stirred and kept below 10° C. throughout the addition. The solution was then allowed to come slowly to room temperature, and to stand stoppered at room temperature for two hours. The solution was evaporated to dryness under vacuum and the product recrystallized from a 3:1 acetone-alcohol mixture. Yield—70.0 g. M.P.—115–117° C. Percent yield—81%.

*Example 3*

A 33⅓% solution of bis(N-methylol carbamoylethyl)-methylamine was prepared in the following manner: bis(carbamoylethyl)methylamine was dissolved in 1.9 times its weight in water and sufficient 36.3% formaldehyde solution added to afford a mole ratio of formaldehyde to bis(carbamoylethyl)methylamine of 2:1. This solution, pH 9.1, of 33⅓% solids concentration was allowed to stand overnight at room temperature. After this time the 33⅓% solution was diluted with sufficient water to give a 10% solids concentration, and 1.5% by weight of hydrated magnesium chloride ($MgCl_2 \cdot 6H_2O$) was added as catalyst, with sufficient 6 N HCl to make the solution to pH 4. The treating solution was padded onto a sample of 80 x 80 cotton print cloth to give a 70–80% wet pickup. The wet fabric was dried at original dimensions for seven minutes at 60° C., and then cured at original dimensions for three minutes at 160° C. The curing step was followed by an afterwash in warm water with a nonionic detergent added, and then tumble drying. The finished fabric possessed a crease recovery angle of 269° (warp+fill) while an untreated, afterwashed sample had a crease recovery angle of only 187° (warp+fill).

*Example 4*

A sample of 80 x 80 cotton print cloth was treated with a 10% bis(N-methylol carbamoylethyl)methylamine solution, and 1.5% magnesium chloride hexahydrate as catalyst, as described in Example 3. This fabric; samples finished with 7½% dimethylol ethyleneurea, catalyzed by 0.5% zinc nitrate hexahydrate+0.05% acetic acid; 7½% dimethylol ethyltriazone, catalyzed by 0.5% zinc nitrate hexahydrate+0.05% acetic acid; and 7½% dimethylol dimethyl succinamide, catalyzed by 0.5% zinc nitrate hexahydrate, were given 5 AATCC 14–53 washes. The effects of these washes on the physical properties of the finishes are listed in Table I.

TABLE I

| Finishing Agent Used | Original | | After 5 AATCC 14–53 Washes | |
|---|---|---|---|---|
| | Crease Rec. Angle (Deg.) W plus F | Brk. Str. Ret. After AATCC 69–1952 Scorch Test Percent Original | Crease Rec. Angle (Deg.) W plus F | Brk. Str. Ret. After AATCC 69–1952 Scorch Test Percent Original |
| Untreated Fabric | 187 | 91 | 172 | 106 |
| 10% Bis (N-methylol carbamoylethyl) methylamine | 269 | 102 | 258 | 114 |
| 7½% Dimethylol dimethyl succinamide | 187 | | | |
| 7½% Dimethylol ethyleneurea | 275 | 108 | 283 | 50 |
| 7½% Dimethylol ethyl triazone | 260 | 95 | 250 | 94 |

The finish produced by bis(N-methylol carbamoylethyl)-methylamine is durable through the AATCC 14–53 washes. The finish is far superior in resistance to damage due to retained chlorine after 5 AATCC 14–53 alkaline washes than is the dimethylol ethyleneurea finish. The bis(N-methylol carbamoylethyl)methylamine finish is equal to or better than the triazone finish in durability, and does not discolor on heating as does the triazone finish. The dimethylol dimethyl succinamide finish shows no improvement in crease resistance over that of the untreated fabric. Table I shows that all the other attempts, mentioned earlier, to improve the resistance to damage due to retained chlorine—an alkyl substituent on the amido nitrogen—a cyclic substituent on the amido nitrogens—and a cyclic substituent containing a tertiary amino group—have either failed to produce a wrinkle resistance finish at all, produced a finish susceptible to discloration from heating, or produced a finish which, though initially acceptable, will break down after launderings. Only the finish containing a tertiary amine in the carboxylic acid moiety, and no alkyl substituent on the amido groups is resistant to discoloration due to heat, and completely durable through the washes.

*Example 5*

The vigorous AATCC 14–53 washes are not the only conditions which may be encountered in the use of a textile. A wrinkle-resistance finish must also be durable through acidic conditions sometimes found in commercial launderies. Table II shows the wrinkle resistance of the bis(N-methylol carbamoylethyl)methylamine finish, with that of two of the finishes listed in Table I, after exposure to solutions of the indicated pH's at 40° C. for thirty minutes. The dimethylol ethyleneurea finish is removed at pH 3.0–3.5, and the triazone finish is removed at pH 2.5–3.0. The fabric finished with bis(N-methylol carbamoylethyl)methylamine shows no loss in wrinkle resistance or nitrogen content of the fabric (96% of the original nitrogen content retained) even at pH 1.

TABLE II

| Finishing Agent Used | Crease Recovery Angle (Deg.) W plus F | | | |
|---|---|---|---|---|
| | pH 1 | pH 2.5 | pH 3.5 | pH 6 |
| 10% Bis (N-methylol carbamoylethyl) methylamine | 261 | 261 | 265 | 261 |
| 7½% Dimethylol ethyleneurea | | 204 | 262 | 283 |
| 7½% Dimethylol ethyl triazone | 208 | 231 | 252 | 262 |

*Example 6*

A 33⅓% solution of tris(N-methylol carbamoylethyl)-amine was prepared in the following manner: tris(carbamoylethyl)amine was dissolved in 2.1 times its weight in water and sufficient 36.3% formaldehyde solution added to afford a mole ratio of formaldehyde to tris(carbamoylethyl)amine of 3.2:1. This solution, pH 8.5, of 33⅓% solids concentration was allowed to stand overnight at room temperature. After this time the 33⅓% solution was diluted with sufficient water to give a 10% solids concentration, and 1.5% by weight of hydrated magnesium chloride ($MgCl_2 \cdot 6H_2O$) was added as catalyst, with sufficient 6 N HCl to make the solution to pH 4. The treating solution was padded onto a sample of 80 x 80 cotton print cloth to give a 70–80% wet pickup. The wet fabric was dried at original dimensions for seven minutes at 60° C., and then cured at original dimensions for three minutes at 160° C. The curing step was followed by an afterwash in warm water with a nonionic detergent added, and then tumble drying. The finished fabric possessed a crease recovery angle of 274° (warp+fill) while an untreated, afterwashed sample had a crease recovery angle of only 187° (warp+fill).

The fabric so finished is durable through the acidic conditions cited in Example 5 and the rigorous AATCC 14–53 washes cited in Example 4. Table III shows the wrinkle resistance of the tris(N-methylol carbamoylethyl)amine finish after exposure to solutions of the indicated pH's.

TABLE III

| Crease Recovery Angle (Deg.) Warp Plus Fill | | | |
|---|---|---|---|
| pH 1 | pH 2.5 | pH 3.5 | pH 6 |
| 274 | 274 | 269 | 272 |

The fabric finished with tris(N-methylol carbamoylethyl)amine shows no loss in wrinkle resistance or nitrogen content of the fabrics (100% of the original nitrogen content retained) even at pH 1.

Table IV shows the effects of the AATCC 14–53 washes on the physical properties of the finish produced by tris-(N-methylol carbamoylethyl)amine.

TABLE IV

| Original | | After 5 AATCC 14-53 Washes | |
|---|---|---|---|
| Crease Rec. Angle (Deg.) W + F | Brk. Str. Ret. After AATCC 69-1952 Scorch Test Percent Original | Crease Rec. Angle (Deg.) W ± F | Brk. Str. Ret. After AATCC 69-1952 Scorch Test Percent Original |
| 274 | 98 | 274 | 96 |

The finish so produced is durable through the AATCC 14–53 washes both in retention of crease recovery and resistance to damage due to retained chlorine.

We claim:

A process comprising wetting a cellulose textile with an aqueous solution containing, by weight, about from 0.5% to 3.0% of an acid catalyst and about from 1 to 20% of tris(N-methylol carbamoylethyl)amine to a wet pickup of about from 60 to 100%, curing the wetted textile at a temperature of about from 120° to 160° C. for about from 0.5 to 10 minutes, the lower temperature being employed with the longer time intervals to react said compound with the textile, and removing unreacted materials from the cured textile, thereby to produce a modified textile characterized in that it is wrinkle resistant, will withstand hypochlorite bleaching without damage to the textile, and is durable to laundering in which acidic or alkaline conditions are encountered.

References Cited by the Examiner

UNITED STATES PATENTS

| 2,219,375 | 10/1940 | Widmer et al. | |
| 2,663,733 | 12/1953 | Subluskey | 260—561 |
| 2,676,936 | 4/1954 | Schofield | 260—561 |
| 2,765,336 | 10/1956 | Hurwitz et al. | 260—561 |
| 2,819,307 | 1/1958 | Albert | 260—561 |
| 2,985,544 | 5/1961 | de Monterey et al. | 117—143 |
| 2,985,546 | 5/1961 | Leavitt | 117—143 |

FOREIGN PATENTS

| 1,157,349 | 12/1957 | France. |
| 1,072,082 | 12/1959 | Germany. |

NORMAN G. TORCHIN, *Primary Examiner.*

IRVING MARCUS, WILLIAM D. MARTIN,
*Examiners.*

R. L. PRICE, H. WOLMAN, T. G. DAVIS, D. LEVY,
*Assistant Examiners.*